United States Patent
Martellini et al.

(10) Patent No.: US 12,513,812 B2
(45) Date of Patent: Dec. 30, 2025

(54) COMPACT D-LI NEUTRON GENERATOR APPARATUS, SYSTEM AND METHOD FOR THE PRODUCTION OF ISOTOPES

(71) Applicant: Actinium LLC, Cambridge, MA (US)

(72) Inventors: Maurizio Martellini, Milan (IT); Giuseppe Gherardi, Bologna (IT); Lidia Falzone, Buguggiate (IT); Cristina Costamagna, Narzole (IT); Ka-Ngo Leung, Berkeley, CA (US); James Kin-Bon Leung, Berkeley, CA (US)

( * ) Notice: Subject to any disclaimer, the term of this patent is extended or adjusted under 35 U.S.C. 154(b) by 495 days.

(21) Appl. No.: 18/075,577

(22) Filed: Dec. 6, 2022

(65) Prior Publication Data

US 2024/0032182 A1    Jan. 25, 2024

Related U.S. Application Data

(60) Provisional application No. 63/390,423, filed on Jul. 19, 2022.

(51) Int. Cl.
    *H05H 3/06*    (2006.01)
    *H05H 6/00*    (2006.01)

(52) U.S. Cl.
    CPC .............. *H05H 3/06* (2013.01); *H05H 6/00* (2013.01)

(58) Field of Classification Search
    None
    See application file for complete search history.

(56) References Cited

U.S. PATENT DOCUMENTS

| | | | |
|---|---|---|---|
| 2019/0380195 A1* | 12/2019 | Radel | H05H 6/00 |
| 2021/0027905 A1 | 1/2021 | Robertson et al. | |
| 2022/0199276 A1* | 6/2022 | Bernstein | G21G 1/10 |

FOREIGN PATENT DOCUMENTS

| | | | | |
|---|---|---|---|---|
| WO | WO-2023281539 A1 * | 1/2023 | | G21K 5/04 |

OTHER PUBLICATIONS

Leung, Ka-Ngo, et al., "Feasibility study on medical isotope production using a compact neutron generator." Applied Radiation and Isotopes 137 (2018): 23-27. Elsevier, Amsterdam, NL.
(Continued)

*Primary Examiner* — James Choi
(74) *Attorney, Agent, or Firm* — Gregory Finch; Finch Paolino, LLC

(57) ABSTRACT

The present disclosure provides a D-$^7$Li neutron generator system and methods for producing a large amount of $^{225}$Ac. High flux 10 and 13 MeV neutrons generated by the (D-$^7$Li) reaction are used to irradiate $^{226}$Ra forming $^{225}$Ra/$^{225}$Ac via the $^{226}$Ra(n,2n)$^{225}$Ra reaction. The generator consists of three main components: (1) a surface-production type negative ion source; (2) an extraction and acceleration column; and (3) a beam target Lithium electrode to irradiate $^{226}$Ra resulting in the formation of $^{225}$Ac. The methods enable the negative deuterium ion-base compact neutron generation system to generate reliably high yield of neutron flux in the absence of back-streaming electrons for producing $^{225}$Ac in large quantities but with a very small percentage of $^{227}$Ac (~1%).

15 Claims, 4 Drawing Sheets

(56) References Cited

OTHER PUBLICATIONS

Kasliwal, Ravi. "Product Quality Considerations in Actinium-225 Radiopharmaceuticals." 38 pages. FDA—NRC Workshop 2021. U.S. Food & Drug Administration, Silver Spring, MD.

Leung, K.N et al., "Abstract. Self-extraction negative ion source." Review of Scientific Instruments 53, 803 (1982). AIP Publishing. Accessed online Dec. 21, 2022 at https://aip.scitation.org/doi/10.1063/1.1137050.

* cited by examiner

COMPACT D-LI NEUTRON GENERATOR APPARATUS, SYSTEM AND METHOD FOR THE PRODUCTION OF ISOTOPES

CROSS-REFERENCE TO RELATED APPLICATIONS

This application claims priority benefit of U.S. Provisional Application Ser. No. 63/390,423 filed Jul. 19, 2022, and entitled, "COMPACT D-Li NEUTRON IRRADIATION SYSTEM FOR Ac-225 PRODUCTIONS," the entirety of which is hereby incorporated herein at least by virtue of this reference.

FIELD

The present disclosure relates generally to an apparatus and methods for producing alpha-particle-emitting radioisotopes, more specifically to the construction of a compact and portable D-$^7$Li neutron source for generating $^{225}$Ra/$^{225}$Ac radioisotopes and their uses in preclinical and clinical Targeted Alpha Therapy (TAT).

BACKGROUND

Nuclear medicine uses radionuclides for imaging and therapeutic applications. Actinium-225 ($^{225}$Ac), an alpha-particle-emitting isotope, has emerged as a promising nuclear radiation therapeutic for Targeted Alpha-Particle Therapy (TAT) that employs radioactive substances to treat diseased tissues (e.g., tumors) at proximity. $^{225}$Ac has a half-life ($T_{1/2}$) of 10 days, causing the emission of four α-particles in a serial decay accompanied by γ-radiation. This nuclide has great therapeutic potential when radiochemistry can produce stable binding to $^{225}$Ac and its daughters. Currently, the global supply of $^{225}$Ac is insufficient and the demand for this isotope has spurred several developmental efforts, including extraction from $^{233}$U, high energy protons or photons irradiation of $^{226}$Ra, or spallation of $^{32}$Th by 100 MeV protons. These development efforts require cumbersome extraction methods or limited quantity production using large, expensive accelerators and nuclear reactors.

The foregoing examples of the related art and limitations related thereto are intended to be illustrative and not exclusive. There remains a need for improved production methods of $^{225}$Ac, especially methods that employ compact devices capable of producing high neutron generation or yield with low power requirements. Other limitations of the related art will become apparent to those of skill in the art upon a reading of the specification and a study of the drawings.

SUMMARY

The following presents a simplified summary of some embodiments of the invention to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Certain aspects of the present disclosure provide for a compact neutron generation system comprising at least one ion source chamber, ion source, RF generator, RF antenna, converter, source exit electrode, magnetic field generator, extraction-accelerator column, ion beam target electrode, radioactive sample, deuterium gas, gas dispenser/inlet, needle valve, pump station, getter dispenser, and cooling channel. In various embodiments, the ion source may comprise a surface-conversion type ion source configured to produce one or more deuterium ion; more particularly, a negative deuterium ion. In various embodiments, the RF generator may comprise a power supply, ferrite transformer, matching network further comprising at least one resistor, inductor, and a tunable capacitor. The RF generator may be configured to drive RF currents through said RF antenna to heat the plasma generated within the ion source chamber. In various embodiments, the matching network may be configured to match the impedance of the antenna and plasma to the RF generator to maximize the power transferred to the plasma. In various embodiments, the converter may comprise a metallic electrode, including but not limited to, titanium, barium, or the like. In various embodiments, the converter may comprise a concave ion emitting surface. In various embodiments, the source electrode may comprise an electrode having a negative bias voltage relative to the plasma to generate negative deuterium ion on the converter surface and subsequent acceleration across the plasma sheath. In various embodiments, the source exit electrode may comprise an electrode having a positive bias voltage relative to the source chamber to eliminate the exit of positive deuterium ions and electrons generated within the source chamber to minimize the exposure of the target electrode to X-rays. In various embodiments, the target electrode may comprise a metallic electrode, with high thermal conductivity, including but not limited to, aluminum, steel, or the like. In various embodiments, the getter dispenser, may comprise a dispenser to dispense Cesium. The dispenser may be configured within the ion source chamber to enable the lowering of the work-function of the converter with Cesium. In an alternative embodiment, the getter Cesium dispenser may be replaced by a Cesium oven.

In accordance with certain aspects of the present disclosure, the magnetic field may be generated within the ion source chamber using one or more rows of magnets to form a multi-cusp magnetic field configuration for plasma confinement. In various embodiments, the antenna may comprise an internal antenna coil fabricated from copper tubing with its outer surface coated with a dielectric coating, including but not limited to glass or the like, to prevent sputtering of the copper by the plasma ions generated within the ion source chamber. In various embodiments, the accelerator column comprises a cylindrical column fabricated from non-limiting high-density polyethylene (HDPE). The hollow part of the HDPE column may be connected to a pumping station to maintain an internal column pressure lower than $5\times10^{-4}$ Torr. In various embodiments, the target electrode may comprise a cylinder with an internal bottom surface coated with a target material, preferably a non-conducting Lithium (Li) metal, compound, or the like. In various embodiments, the target electrode may comprise said cylinder having at least one external surface coated with at least one layer of $^{226}$Ra, preferably with an optimal thickness to reduce the progeny production of $^{227}$Ra. The D-$^7$Li neutron generator may be configured to produce $^{225}$Ac from irradiation of at least one said $^{226}$Ra samples forming $^{225}$Ra/$^{225}$Ac via the $^{226}$Ra(n,2n)$^{225}$Ra nuclear reaction.

An aspect of the present disclosure is a method of producing $^{225}$Ac using a D-$^7$Li neutron generator system. In various embodiments, the method may comprise the generation of high flux 10 and 13 MeV neutrons via the (D-$^7$Li)

reaction. These high energy neutrons are then used to irradiate $^{226}$Ra samples forming said $^{225}$Ra/$^{225}$Ac via the $^{226}$Ra(n,2n)$^{225}$Ra nuclear reaction. In various embodiments, one or more negative deuterium ions are generated using a surface-production type ion source. In various embodiments, the method may comprise the generation of deuterium plasma using a 13.5 MHz induction discharge via an internal antenna coil. In various embodiments, deuterium gas is introduced into a source chamber by means of a needle valve. In various embodiments, the source pressure during discharge operation may be maintained at 1×10$^{-3}$ Torr or lower. In various embodiments, the method of generating negative deuterium ion may comprise the insertion of a converter electrode, preferably titanium or barium, into the source chamber. In various embodiments, the method may comprise the application of a bias voltage to the converter electrode with respect to the plasma which will repel one or more negative deuterium ion from the converter electrode surface and accelerate said ion across a plasma sheath. In various embodiments, the method may comprise the use of a concave converter electrode to focus a beam comprising said negative ions to converge at a focal point approximately inside the source exit electrode. In various embodiments, the method may comprise the use of a bias field applied to the exit electrode relative to the source chamber to eliminate the exit of positive deuterium ions and electrons generated within the source chamber to minimize the exposure of the target electrode to X-rays. In various embodiments, the method may comprise the introduction of Cesium vapor, using said getter Cesium dispenser, into the source plasma to lower the work function of the converter electrode. In various embodiments, the method may comprise the introduction of compressed air using an inlet hole to actively cool the chamber during plasma discharge operation. In various embodiments, the method for producing neutron may comprise the connection of a non-limiting 400 kV DC power supply to the target electrode using a high voltage cable which goes through the accelerator column. These methods enable the negative deuterium ion-base compact neutron generation system to generate reliably high yield of neutron flux in the absence of back-streaming electrons for producing $^{225}$Ac.

Still further aspects of the present disclosure provide for a neutron generation system comprising a generator housing comprising an exterior surface and an interior chamber comprising an ion source chamber and a source exit aperture, the source exit aperture extending through a portion of the exterior surface; an ion source housed in the ion source chamber, the ion source comprising a surface-conversion type ion source configured to produce negative deuterium ions; a magnetic field generator housed in the ion source chamber, the magnetic field generator comprising a plurality of magnets surrounding the ion source; a converter operably engaged with the ion source, the converter comprising a first electrode and a concave ion emitting surface, wherein the first electrode is operably configured to emit a negative bias voltage to generate negative deuterium ions on the concave ion emitting surface and accelerate the negative deuterium ions, wherein the concave ion emitting surface is configured to focus the negative deuterium ions in the form of a beam and direct the beam through the source exit aperture; a source exit electrode housed in the interior chamber adjacent to the source exit aperture, the source exit electrode comprising a second electrode configured to emit a positive bias voltage; an accelerator column comprising an outer surface and a cylindrical interior chamber extending from a first end of the accelerator column to a second end of the accelerator column, wherein the accelerator column is coupled to the exterior surface of the generator housing such that the cylindrical interior chamber is aligned with the source exit aperture; and a target electrode coupled to the second end of the accelerator column, the target electrode comprising a proximal interior surface and a distal exterior surface, wherein the proximal interior surface is coated with a target material comprising Lithium or a Lithium compound and the distal exterior surface is coated with at least one layer of a Radium-226 sample, wherein the target electrode is oriented in a path of the beam of negative deuterium ions.

Still further aspects of the present disclosure provide for a neutron generation method comprising generating, with a converter electrode, one or more negative deuterium ions on a surface of the converter electrode using a surface-production type ion source, wherein the surface of the converter electrode comprises a concave surface, wherein the surface-production type ion source and the converter electrode are housed in an interior chamber of a housing; applying a negative bias voltage to the converter electrode via a power source to accelerate the one or more negative deuterium ions from the concave surface of the converter electrode, wherein the concave surface is configured to focus the one or more negative deuterium ions into a beam that converges at a focal point; applying, via the power source, a positive bias voltage to an exit electrode housed in the interior chamber of the housing, wherein the exit electrode is oriented in the interior chamber of the housing in a path of the beam of the one or more negative deuterium ions adjacent to the focal point; and irradiating a target electrode with the beam of the one or more negative deuterium ions, wherein the target electrode is housed in an accelerator column extending from the interior chamber of the housing, wherein the target electrode is positioned downstream from the exit electrode relative to the beam of the one or more negative deuterium ions, wherein a surface of the target electrode is coated with at least one layer of a Radium-226 sample.

BRIEF DESCRIPTION OF DRAWINGS

The above and other objects, features and advantages of the present disclosure will be more apparent from the following detailed description taken in conjunction with the accompanying drawings, in which.

DETAILED DESCRIPTION

Figure 1:
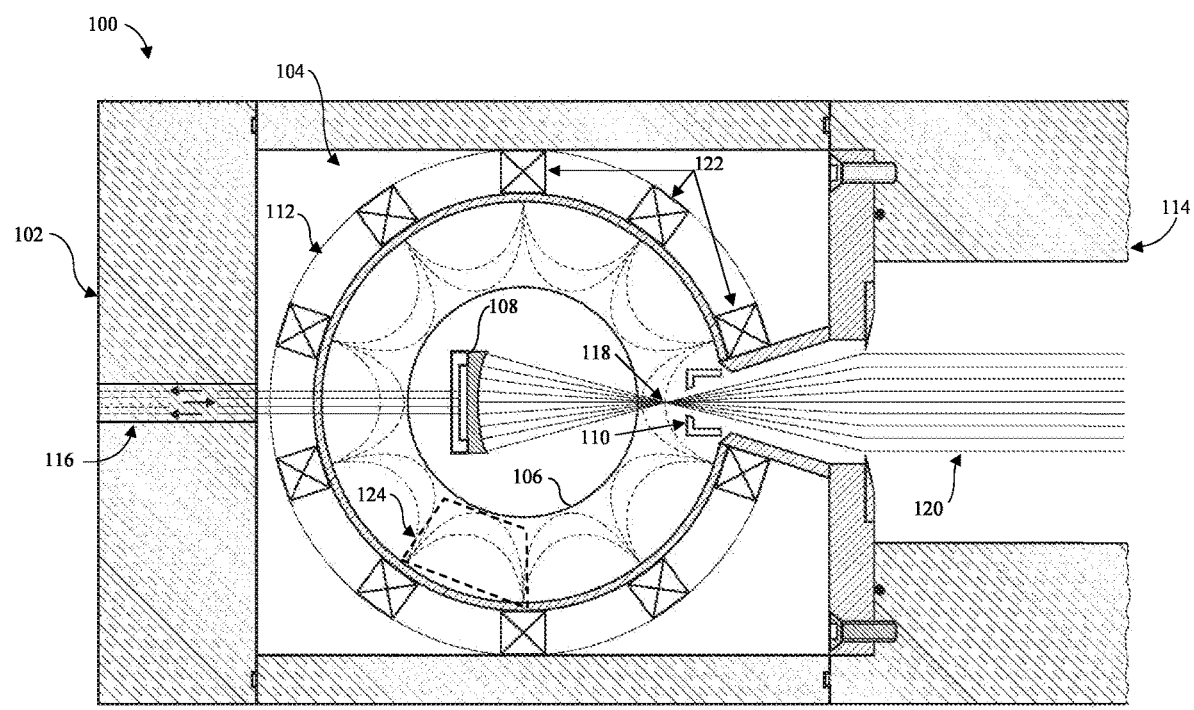
FIG. 1 is a cross-sectional view of a surface-conversion type D$^-$ ion source apparatus and system, in accordance with certain aspects of the present disclosure.

It should be appreciated that all combinations of the concepts discussed in greater detail below (provided such concepts are not mutually inconsistent) are contemplated as being part of the inventive subject matter disclosed herein. It also should be appreciated that terminology explicitly employed herein that also may appear in any disclosure incorporated by reference should be accorded a meaning most consistent with the concepts disclosed herein.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. The present disclosure should in no way be limited to the exemplary implementation and techniques illustrated in the drawings and described below.

Where a range of values is provided, it is understood that each intervening value, to the tenth of the unit of the lower limit unless the context clearly dictates otherwise, between the upper and lower limit of that range and any other stated or intervening value in that stated range is encompassed by the invention. The upper and lower limits of these smaller ranges may independently be included in the smaller ranges, and are also encompassed by the invention, subject to any specifically excluded limit in a stated range. Where a stated range includes one or both endpoint limits, ranges excluding either or both of those included endpoints are also included in the scope of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited.

As used herein, the term "includes" means includes but is not limited to, the term "including" means including but not limited to. The term "based on" means based at least in part on.

As used herein, "exemplary" means serving as an example or illustration and does not necessarily denote ideal or best.

As used herein, "barn" (symbol: b) is a metric unit of area equal to $10^{-28}$ m² used in nuclear or high energy physics for expressing the cross-sectional area of nuclei and nuclear reactions and/or the cross sections of any scattering process.

There are two fusion reactions capable of producing high energy neutrons: the (Deuterium (D)—Tritium(T)) and the (D–$^7$Li) reactions. The (D–$^7$Li) reaction produces both neutrons and gamma photons.

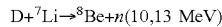
$$D + {}^7Li \rightarrow {}^8Be + n (10, 13 \text{ MeV})$$

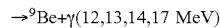
$$\rightarrow {}^9Be + \gamma (12, 13, 14, 17 \text{ MeV})$$

To produce $^{225}$Ra via the (n, 2n) reaction in a $^{226}$Ra sample, the energy of the incoming neutrons must exceed 6.5 MeV. The (D–T) reaction produces 14 MeV neutrons which has a cross-section of ~700 mb for the (n, 2n) reaction in the production of $^{225}$Ra. The $^{226}$Ra(n,2n)$^{225}$Ra reaction cross-section for 10 and 13 MeV neutrons is ~2 barn. In comparison, the $^{226}$Ra(n, γ)$^{227}$Ra neutron capture cross-section for 10 and 13 MeV neutrons is five orders of magnitude smaller than that of the $^{226}$Ra(n,2n)$^{225}$Ra reaction for high energy neutrons. Therefore, production probability of 227Ra directly by the 10 and 13 MeV neutrons is likely to be low. However, some of these high energy neutrons can lose their energy in passing through the Ra-226 layer to become epithermal or thermal neutrons. The Ra-226 isotopes can capture these low energy neutrons to form $^{227}$Ra/$^{227}$Ac, but the cross-section of this reaction is limited to ~0.1 barn. The long-lived $^{227}$Ac ($t^{1/2}$=21.8 yrs.) are not desirable for clinical targeted radionuclide therapy (TAT). It has been established that the acceptable clinical limit for $^{227}$Ac impurity is 2%.

In a positive D⁺ ion-based neutron generator, a large amount of secondary emission electrons can be generated at the target electrode by the incoming ions. If these electrons are not properly suppressed, they will accelerate back (backstream) to the ion source by producing unwanted high energy X-rays which could cause damage to the source chamber. In addition, they may also create voltage breakdown issues in the column and may increase the drain current of the high voltage power supply.

In a negative D⁻ ion-based neutron generator, all secondary emission electrons produced by the incident ion beam will return to the positively biased target electrode. The absence of back-streaming electrons greatly enhances the efficiency for neutron production and provides significantly better operational reliability. Further, since there are no stable negative molecular deuterium ions, a pure atomic D⁻ ion beam is extracted from the source and the fusion reactions at the target will occur at the full acceleration energy. It has also been demonstrated that the surface charging voltage, due to a negative ion beam impinging on a nonconducting target surface, is only several volts. This effect allows thick non-conducting Lithium targets for the (D–$^7$Li) reaction to be used and prevents the D⁻ ion beam from being deflected away from the target electrode.

The accelerated deuterium ions will impinge on a thick Lithium target which takes the form of either a pure Lithium metal or a Lithium compound (such as $Li_2O$, LiF or LiH) for 10 and 13 MeV neutron production. For a D⁺ ion beam, only the conducting lithium metal target will not create charging issue. If D⁻ ion beam is employed, then the target can be either the conducting Lithium metal or the insulating Lithium compounds which normally have a much higher melting temperature. To dissipate the high beam power (4 kW), the target electrode should be actively cooled by circulating air or deionized water.

Exemplary embodiments of the present disclosure provide a D⁻ $^7$Li neutron generator system and methods for the producing a large amount of $^{225}$Ac. High flux 10 and 13 MeV neutrons generated by the (D⁻ $^7$Li) reaction are used to irradiate $^{226}$Ra forming $^{225}$Ra/$^{225}$Ac via the $^{226}$Ra(n,2n) $^{225}$Ra reaction. The generator consists of three main components: (1) a surface-production type negative ion source; (2) an extraction and acceleration column; and (3) a beam target Lithium electrode to irradiate $^{226}$Ra resulting in the formation of $^{225}$Ac. The methods enable the negative deuterium ion-base compact neutron generation system to generate reliably high yield of neutron flux in the absence of back-streaming electrons for producing $^{225}$Ac in large quantities.

An aspect of the present disclosure is a compact neutron generation system. Referring now to FIG. 1, a side view illustration 100 of a surface-conversion type D⁻ ion source is shown, according to various embodiments. The D⁻ $^7$Li neutron generator 102 may comprise at least one ion source chamber 104 comprising a D⁻ ion source 106, converter electrode 108, source exit electrode 110, magnetic field generator 112, extraction-accelerator column 114, and cooling channel 116. In various embodiments, converter electrode 108 may comprise a metallic electrode, including but not limited to, titanium, barium, or the like. In various embodiments, converter electrode 108 may comprise a concave ion emitting surface of approximately 30 mm in diameter capable of producing a beam of negative deuterium that converge at focal point 118. In various embodiments, the source electrode of converter electrode 108 may comprise an electrode having a negative bias voltage, preferably −250 V to −300 V relative to the plasma to generate negative deuterium ions on the converter surface and subsequent acceleration across the plasma sheath in the form of a D⁻ ion beam 120 within extraction-accelerator column 114. In various embodiments, the source exit electrode 110 may comprise an electrode having a positive bias voltage, preferably +25 V to +35 V relative to the source chamber to eliminate the exit of positive deuterium ions and electrons generated within the source chamber to minimize the exposure of the target electrode to X-rays. In various embodiments, magnetic field may be generated within the ion source chamber 104 by magnetic field generator 112 using one or more rows of magnets 122 to form a multi-cusp magnetic field configuration 124 for plasma confinement. In various embodiments, the number of magnets (0.8 to 1.4 T) may be but not limited to 4, 6, 8, 10, 12, or 14. In various embodiments, the magnets may comprise ceramic, sintered $Nd_2Fe_{14}B$, bonded $Nd_2Fe_{14}B$, sintered $SmCo_5$, sintered $Sm(Co,Fe,Cu,Zr)_7$ and the like or combinations thereof. In various embodiments, multi-cusp magnetic field configuration 124 may comprise non-limiting 8 to 16 pole, front, sides, back. In various embodiments, the accelerator column 114 comprises a cylindrical column fabricated from non-limiting high-density polyethylene (HDPE). The hollow part of the HDPE column is connected to a pumping station to maintain an internal column pressure lower than $5 \times 10^{-4}$ Torr. The D–$^7$Li neutron generator may be configured to produce $^{225}$Ac from irradiation of at least one said $^{226}$Ra samples, thereby forming $^{225}$Ra/$^{225}$Ac via the $^{226}$Ra(n,2n)$^{225}$Ra nuclear reaction.

Figure 2:
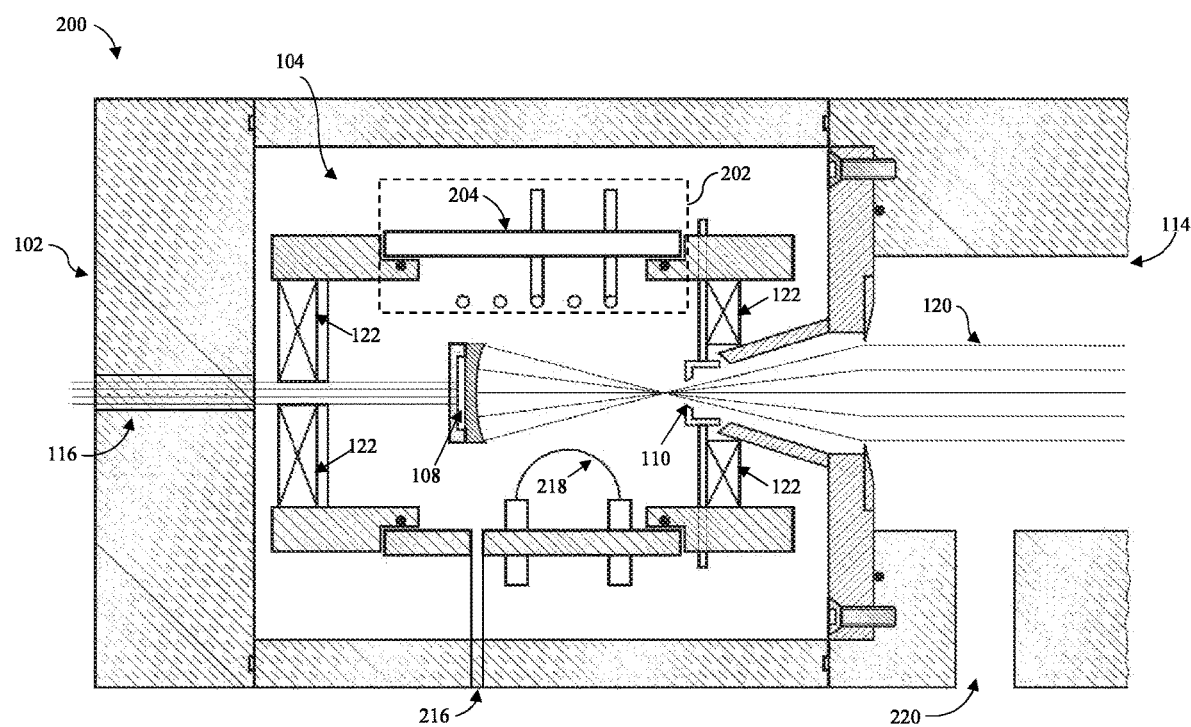
FIG. 2 is a top plan view of a surface-conversion type D$^-$ ion source apparatus and system, in accordance with certain aspects of the present disclosure.

Referring now to FIG. 2, a top view illustration 200 of D–$^7$Li neutron generator 102. Compact generator 102 may comprise a surface-conversion type D⁻ ion source. In accordance with certain aspects of the present disclosure, D–$^7$Li neutron generator 102 may comprise at least one RF generator 202. RF generator 202 may comprise an RF antenna comprising one or more antennal coil 204. D–$^7$Li neutron generator 102 may comprise converter electrode 108, magnet 122, source exit electrode 110, extraction-accelerator column 114, cooling channel 116, a gas inlet 216, a getter dispenser 218, and a pump-outlet 220 for evacuating the internal pressure of ion source chamber 104. In various embodiments, RF generator 202 may comprise a power supply, ferrite transformer, matching network further comprising at least one resistor, inductor, and tunable capacitor (these elements are well known in the art and not shown in FIG. 2) and may be configured to drive RF currents through antenna coil 204 to heat the plasma generated within the ion source chamber 104. In various embodiments, RF generator 202 may comprise a solid-state amplifier. In various embodiments, the matching network may be configured to match the impedance of the antenna coil 204 and plasma to RF generator 202 (e.g., 50 Ohm impedance) to maximize the power transferred to the plasma and formation of D⁻ ion beam 120. In various embodiments, D–$^7$Li neutron generator 102 may be configured to operate in a pulse or continuous (CW) mode. In various embodiments, one or more pulse mode may comprise the switching of the RF power ON and OFF. In certain embodiments, RF generator 202 comprises a fast rise-time RF generator. In various embodiments, one or more extractable current density is increased linearly with the RF power input to achieve a high beam current by applying high RF power.

In various embodiments, the getter dispenser 218 may comprise a dispenser (e.g., SAES Cs dispenser). Getter dispenser 218 may be configured to dispense a volume of Cesium into ion source chamber 104. Getter dispenser 218 may be operably configured within ion source chamber 104 to enable the lowering of the work-function of the converter with Cesium. In an alternative embodiment, getter dispenser 218 may be replaced by a Cesium oven. In alternative embodiments, the work function may be lowered by using various other surfaces, including but not limited to, MoLa, WLa, $LaB_6$, Cs doped Mo, stainless steel, and Cs. In various embodiments, antenna coil 204 may comprise an internal antenna coil fabricated from copper tubing with its outer surface coated with a dielectric coating, including but not limited to, glass or the like, to prevent sputtering of the copper by the plasma ions generated within ion source chamber 104. In various embodiments, accelerator column 114 is fabricated from non-limiting high-density polyethylene (HDPE) and comprises an elongated cylindrical column. Accelerator column 114 may comprise a pump-outlet 220 extending through a side wall of accelerator column 114 between an exterior surface and an interior area of the elongated cylindrical column. Pump-outlet 220 is configured to be connected to a pumping station comprising a pump configured to maintain an internal pressure of accelerator column 114 lower than $5 \times 10^{-4}$ Torr. In various embodiments, the pump may comprise a non-limiting turbo molecular pump. In various embodiments, the pumping station may be configured to determine one or more internal pressure of accelerator column 114. Pumping stations and pumps are well known in the art and are not shown in FIG. 2. The D–$^7$Li neutron generator may be configured to produce $^{225}$Ac from irradiation of at least one said $^{226}$Ra samples forming $^{225}$Ra/$^{225}$Ac via the $^{226}$Ra(n,2n)$^{225}$Ra nuclear reaction. In various embodiments, D–$^7$Li neutron generator apparatus 102 may be configured to generate, including but not limited to, fast, epithermal, or thermal neutrons. A moderator unit may be used to convert the multi-MeV neutrons to either thermal or epithermal neutrons.

An aspect of the present disclosure is a method of producing $^{225}$Ac using D–$^7$Li neutron generator system (e.g., D–$^7$Li neutron generator system 102 of FIG. 1). In various embodiments, the method may comprise the generation of high flux 10 and 13 MeV neutrons via the (D–$^7$Li) reaction. These high energy neutrons are then used to irradiate $^{226}$Ra samples forming said $^{225}$Ra/$^{225}$Ac via the $^{226}$Ra(n,2n)$^{225}$Ra nuclear reaction. In various embodiments, one or more negative deuterium ions are generated using said surface-production type ion source (i.e., D⁻ ion source 106 of FIG. 1). In various embodiments, the method may comprise the generation of deuterium plasma using preferably a 13.5 MHz induction discharge via an internal antenna coil (e.g., antenna coil 204 of FIG. 2). In an exemplary embodiment, the antenna comprises a 3-mm diameter copper tube with the outer surface coated with a thin layer of glass to prevent sputtering of the copper from the antenna by the plasma ions. It will also prevent "short circuit" of the antenna current between the two antenna legs. In various embodiments, the antenna may comprise at least one turn, preferably two or two and a half turn, most preferably three turns. In various embodiments, deuterium gas, in the non-limiting amount of 1 mTorr, is introduced into a source chamber by means of a needle valve. In various embodiments, the source pressure during discharge operation may be maintained at $1 \times 10^{-3}$ Torr or lower. In various embodiments, the method of generating negative deuterium ion may comprise the insertion of a converter electrode (e.g., converter electrode 108 of FIG. 1), preferably titanium or barium, into the ion source chamber (e.g., ion source chamber 104 of FIG. 1). In an alternative embodiment, a method to enhance the D⁻ ion production is to replace the titanium converter with a barium converter. The work-function for barium is quite low (2.7 eV). Therefore, one can produce higher D– current than a clean titanium converter. With a 25-mm diameter barium converter, 10 mA of D– ion beam current should be achievable when the ion source is operated with modest RF input power. This exemplary converter arrangement will enable the neutron generator to operate continuously for a long time without the use of cesium.

In various embodiments, the method may comprise the application of a bias voltage, preferably −250 V, to the converter electrode (e.g., converter electrode 108 of FIG. 1) with respect to the plasma which will repel one or more negative deuterium ion from the converter electrode surface and accelerate said ion across a plasma sheath. In various embodiments, the method may comprise the use of said concave converter electrode to focus a beam comprising said negative ions to converge at a focal point (e.g., focal point 118 of FIG. 1) approximately inside a source exit electrode (e.g., source exit electrode 110 of FIG. 1). In various embodiments, the method may comprise the use of a bias field, preferably +30 V, applied to the exit electrode relative to the source chamber to eliminate the exit of positive deuterium ions and electrons generated within the source chamber to minimize the exposure of the target electrode to X-rays. In various embodiments, the method may comprise the introduction of Cesium vapor via a getter Cesium dispenser (e.g., getter dispenser 218 of FIG. 2) into the source plasma to lower the work function of the converter electrode. In various embodiments, the method may comprise the introduction of compressed air using a gas inlet (e.g., gas inlet 216 FIG. 2) to actively cool the chamber during plasma discharge operation. In various embodiments, the method for producing neutron may comprise the connection of a non-limiting 400 kV DC power supply to the target electrode using a high voltage cable extending through the accelerator column. These methods enable the negative deuterium ion-base compact neutron generation system to generate reliably high yield of neutron flux in the absence of back-streaming electrons for producing $^{225}$Ac.

Figure 3:
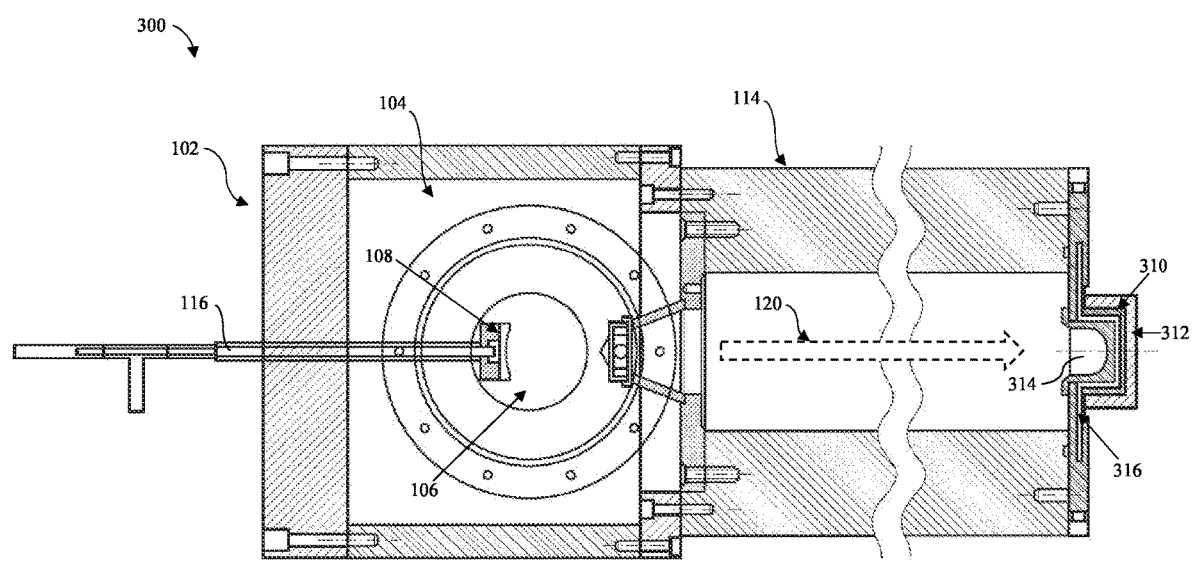
FIG. 3 is a cross-sectional view of a D$^-$-$^7$Li neutron generator apparatus and system for $^{225}$Ac production, in accordance with certain aspects of the present disclosure.

Referring now to FIG. 3, an illustration 300 of a D–$^{7}$Li neutron generator 102 for $^{225}$Ac production is shown. In accordance with certain aspects of the present disclosure, a D–$^{7}$Li neutron generator 102 may comprise D⁻ ion source 106 housed in ion source chamber 104. D⁻ ion source 106 may comprise a D-ion source. D–$^{7}$Li neutron generator 102 may comprise converter electrode 108, an acceleration column 114, a target holder 310, and radioactive $^{226}$Ra sample 312. In an exemplary embodiment, acceleration column 114 may comprise dimensions in the range of about 15 centimeters to 20 centimeters in diameter and about 35 centimeters to 40 centimeters in length; and more particularly about 17 cm diameter by about 38 cm in length. In various embodiments, converter electrode 108 of D–$^{7}$Li neutron generator 102 may be operably engaged with cooling channel 116. In various embodiments, target holder 310 may comprise a target electrode 314 fabricated in a cylindrical form factor or can with an internal distal surface coated with a target material, preferably a non-conducting Lithium (Li) metal, compound, or the like. In various embodiments, Lithium may comprise non-limiting Li$_2$O, LiF, LiH, Lithium hydride, Lithium aluminum hydride, Lithium borohydride, Lithium (tetra/meta)borate, Lithium nitride, Lithium boron nitride, Lithium amide, Lithium nitrate, Lithium sulphite, Lithium hydroxide, Lithium hydroxide monohydrate, Lithium oxide, Lithium chromate, Lithium silicate, Lithium bromide, Lithium chloride, Lithium fluoride, Lithium stearate, Lithium 12-hydroxy-stearate, Lithium decanoate, Lithium acetate, Lithium carbonate, Lithium sulphate, Lithium citrate, or the like, or combination of. In various embodiments, target electrode 314 is fabricated from a metal, preferably with high thermal conductivity, most preferably from aluminum. In various embodiments, the aluminum cylinder may have an inner diameter in the range of about 15 millimeters to 25 millimeters and a length in the range of about 15 millimeters to 25 millimeters; and more particularly an inner diameter of about 20 mm and a length of about 20 mm. In another preferred embodiment, said target electrode is fabricated from a thermal conductive material transparent to D–$^{7}$Li 10 and 13 MeV neutrons. In various embodiments, target electrode 314 may comprise a cylinder having at least one external surface coated with at least one layer of $^{226}$Ra sample 312. In an exemplary embodiment, the layer of $^{226}$Ra sample 312 $^{226}$Ra comprises a thickness less than 5-mm (e.g., 4.99 mm or less) to keep the percentage of the $^{227}$Ra contamination below one percent (i.e., $^{227}$Ac/$^{225}$Ac≈1% for a 5-mm thick sample). In various embodiments, target holder 310 may be cooled by one or more cooling channel 316. In an exemplary embodiment, cooling channel 316 may comprise a 2 mm gap to serve as an air-cooling channel for the target. The D–$^{7}$Li neutron generator 102 may be configured to produce $^{225}$Ac from irradiation of at least one said $^{226}$Ra samples forming $^{225}$Ra/$^{225}$Ac via the $^{226}$Ra(n,2n)$^{225}$Ra nuclear reaction with D⁻ ion beam 120 having a current of at least 10 mA produced by D⁻ ion source 106. The D–$^{7}$Li neutron generator apparatus and system as described in the present disclosure is compact in size compared to prior art accelerators or nuclear reactors for producing $^{225}$Ac. It is simple to operate and has a much smaller footprint than other prior art accelerator systems for $^{225}$Ac production. Coupled with a compact shielding structure, it can be installed conveniently in the radioisotope facilities of Hospital/Clinics to supply locally $^{225}$Ac for TAT treatment.

Figure 4:
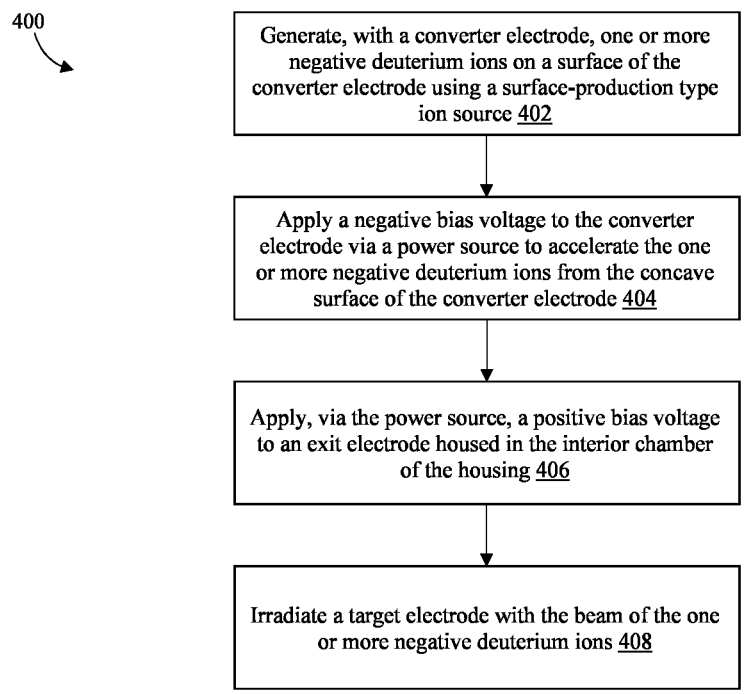
FIG. 4 is a process flow diagram of a method for $^{225}$Ac production, in accordance with certain aspects of the present disclosure.

Referring now to FIG. 4, a process flow diagram of a method 400 for $^{225}$Ac production is shown. In accordance with certain aspects of the present disclosure, method 400 may comprise a method of use for D–$^{7}$Li neutron generator 102, as shown in FIGS. 1-3. In accordance with certain aspects of the present disclosure, method 400 may comprise one or more steps or operations for generating (e.g., with converter electrode 108 of FIGS. 1-3), one or more negative deuterium ions on a surface of the converter electrode using a surface-production type ion source (Step 402). In certain embodiments, the surface of the converter electrode comprises a concave surface. In certain embodiments, the surface-production type ion source and the converter electrode are housed in an interior chamber of a housing. Method 400 may proceed by executing one or more steps or operations for applying a negative bias voltage to the converter electrode via a power source to accelerate the one or more negative deuterium ions from the concave surface of the converter electrode (Step 404). In accordance with certain embodiments, the concave surface is configured to focus the one or more negative deuterium ions into a beam that converges at a focal point. Method 400 may proceed by executing one or more steps or operations for applying, via the power source, a positive bias voltage to an exit electrode (e.g., source exit electrode 110 of FIGS. 1-3) housed in the interior chamber of the housing (Step 406). In accordance with certain embodiments, the exit electrode is oriented in the interior chamber of the housing in a path of the beam of the one or more negative deuterium ions adjacent to the focal point. Method 400 may proceed by executing one or more steps or operations for irradiating a target electrode (e.g., target electrode 314 of FIG. 3) with the beam of the one or more negative deuterium ions (Step 408). In accordance with certain embodiments, the target electrode is housed in an accelerator column (e.g., accelerator column 114 of FIGS. 1-3) extending from the interior chamber of the housing. In accordance with certain embodiments, the target electrode is positioned downstream from the exit electrode relative to the beam of the one or more negative deuterium ions. In accordance with certain embodiments, a surface of the target electrode is coated with at least one layer of a Radium-226 sample.

In accordance with certain aspects of the present disclosure, method 400 may further comprise one or more steps or operations for generating, with a radio frequency antenna coil housed in the interior chamber of the housing (e.g., antenna coil 204 of FIG. 2), deuterium plasma, wherein the interior chamber of the housing contains a volume of deuterium gas. In accordance with certain embodiments, the radio frequency antenna coil is configured to output a 13.5 MHz induction discharge. Method 400 may further comprise one or more steps or operations for dispensing, with a getter dispenser housed in the interior chamber of the housing (e.g., getter dispenser 218 of FIG. 2), a volume of Cesium vapor into the interior chamber of the housing. Method 400 may further comprise one or more steps or operations for injecting, via an inlet extending through the housing (e.g., gas inlet 216 FIG. 2), a volume of compressed air into the interior chamber.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." As used herein, the terms "right," "left," "top," "bottom," "upper," "lower," "inner" and "outer" designate directions in the drawings to which reference is made.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or lists of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The present disclosure includes that contained in the appended claims as well as that of the foregoing description. Although this invention has been described in its exemplary forms with a certain degree of particularity, it is understood that the present disclosure of has been made only by way of example and numerous changes in the details of construction and combination and arrangement of parts may be employed without departing from the spirit and scope of the invention.

What is claimed is:

1. A neutron generation system comprising:
a generator housing comprising an exterior surface and an interior chamber comprising an ion source chamber and a source exit aperture, the source exit aperture extending through a portion of the exterior surface;
an ion source housed in the ion source chamber, the ion source comprising a surface-conversion type ion source configured to produce a deuterium ion;
a magnetic field generator housed in the ion source chamber, the magnetic field generator comprising a plurality of magnets surrounding the ion source;
a converter operably engaged with the ion source, the converter comprising a first electrode and a concave ion emitting surface,
wherein the first electrode is operably configured to emit a negative bias voltage to generate negative deuterium ions on the concave ion emitting surface and accelerate the negative deuterium ions, wherein the concave ion emitting surface is configured to focus the negative deuterium ions in the form of a beam and direct the beam through the source exit aperture;

a source exit electrode housed in the interior chamber adjacent to the source exit aperture, the source exit electrode comprising a second electrode configured to emit a positive bias voltage;

an accelerator column comprising an outer surface and a cylindrical interior chamber extending from a first end of the accelerator column to a second end of the accelerator column, wherein the accelerator column is coupled to the exterior surface of the generator housing such that the cylindrical interior chamber is aligned with the source exit aperture; and a target electrode coupled to the second end of the accelerator column, the target electrode comprising a proximal interior surface and a distal exterior surface, wherein the proximal interior surface is coated with a target material comprising Lithium or a Lithium compound and the distal exterior surface is coated with at least one layer of a Radium-226 sample, wherein the target electrode is oriented in a path of the beam of negative deuterium ions.

2. The neutron generation system of claim 1 further comprising a radio frequency generator and a coil housed in the interior chamber, wherein the radio frequency generator is operably configured to drive a radio frequency current to the coil, wherein the coil is configured to provide heat transfer to the ion source chamber.

3. The neutron generation system of claim 2 wherein the radio frequency generator comprises a solid-state amplifier.

4. The neutron generation system of claim 1 further comprising a getter dispenser housed in the ion source chamber.

5. The neutron generation system of claim 1 wherein the getter dispenser is operably configured to dispense a volume of Cesium vapor into the ion source chamber.

6. The neutron generation system of claim 1 further comprising a pump operably engaged with the accelerator column via a pump outlet extending through the accelerator column, wherein the pump is configured to maintain an internal pressure in the cylindrical interior chamber below $5\times10^{-4}$ Torr.

7. The neutron generation system of claim 1 wherein the accelerator column is constructed from high-density polyethylene.

8. The neutron generation system of claim 1 further comprising a DC power supply operably engaged with the target electrode.

9. The neutron generation system of claim 1 wherein the accelerator column comprises a diameter in the range of 15 centimeters to 20 centimeters and a length in the range of 35 centimeters to 40 centimeters.

10. The neutron generation system of claim 1 wherein the generator housing comprises at least one cooling chamber extending from the exterior surface to the interior chamber, wherein the at least one cooling chamber comprises an inlet configured to receive a volume of compressed air therethrough.

11. The neutron generation system of claim 1 wherein the target electrode comprises a cylindrical form factor.

12. The neutron generation system of claim 11 wherein the target electrode is constructed from aluminum or an aluminum alloy.

13. The neutron generation system of claim 11 wherein the cylindrical form factor comprises an inner diameter in the range of 15 millimeters to 25 millimeters and a length in the range of 15 millimeters to 25 millimeters.

14. The neutron generation system of claim 1 wherein the at least one layer of a Radium-226 sample comprises a thickness of less than 5 millimeters.

15. A neutron generation apparatus comprising:

a generator housing comprising an exterior surface and an interior chamber comprising an ion source chamber and a source exit aperture, the source exit aperture extending through a portion of the exterior surface;

an ion source housed in the ion source chamber, the ion source comprising a surface-conversion type ion source configured to produce a deuterium ion;

a magnetic field generator housed in the ion source chamber, the magnetic field generator comprising a plurality of magnets surrounding the ion source;

a converter operably engaged with the ion source, the converter comprising a first electrode and a concave ion emitting surface, wherein the first electrode is operably configured to emit a negative bias voltage to generate negative deuterium ions on the concave ion emitting surface and accelerate the negative deuterium ions, wherein the concave ion emitting surface is configured to focus the negative deuterium ions in the form of a beam and direct the beam through the source exit aperture;

a source exit electrode housed in the interior chamber adjacent to the source exit aperture, the source exit electrode comprising a second electrode configured to emit a positive bias voltage;

an accelerator column comprising an outer surface and a cylindrical interior chamber extending from a first end of the accelerator column to a second end of the accelerator column, wherein the accelerator column is coupled to the exterior surface of the generator housing such that the cylindrical interior chamber is aligned with the source exit aperture; and a target assembly coupled to the second end of the accelerator column, the target assembly comprising a target electrode comprising a proximal interior surface and a distal exterior surface, wherein the proximal interior surface is coated with a target material comprising Lithium or a Lithium compound and the distal exterior surface is coated with at least one layer of a Radium-226 sample, wherein the target electrode is oriented in a path of the beam of negative deuterium ions.

* * * * *